June 28, 1938. W. G. L. SMITH 2,122,240
REPLACEABLE MOLDED RUBBER MAT
Filed Dec. 15, 1936
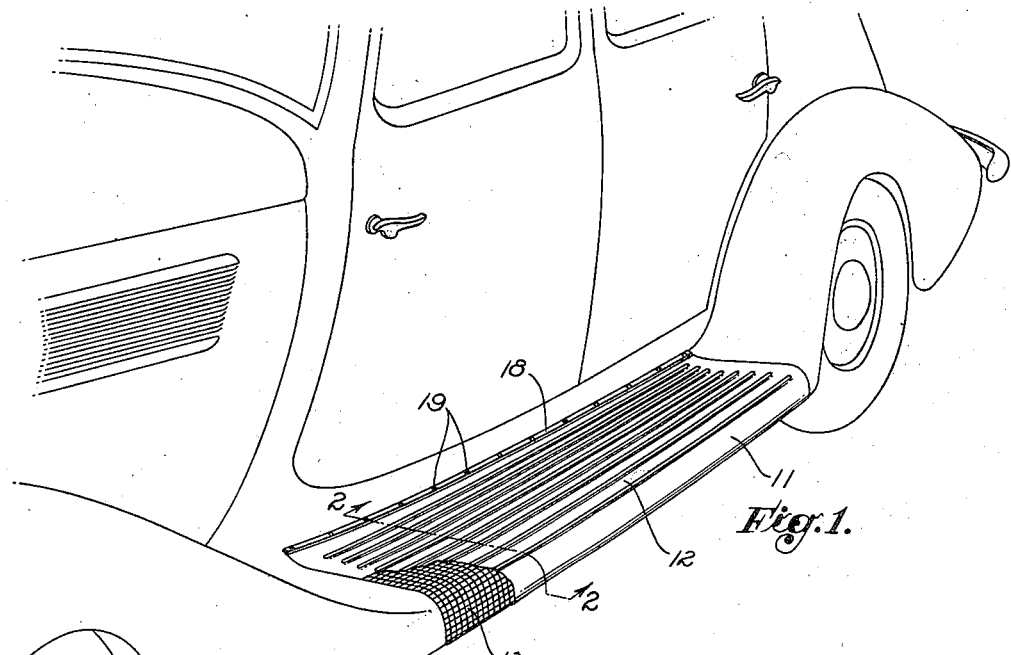
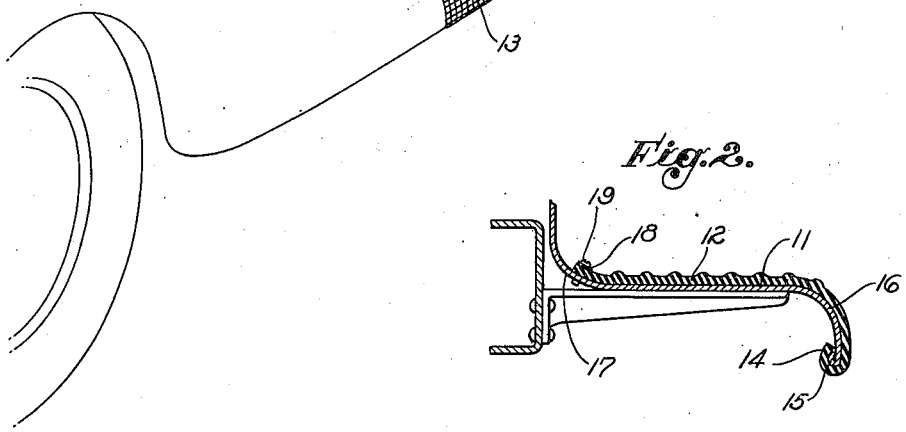
INVENTOR
WALTER G.L. SMITH
BY
*Fred W Lewis*
ATTORNEY.

Patented June 28, 1938

2,122,240

UNITED STATES PATENT OFFICE 2,122,240

REPLACEABLE MOLDED RUBBER MAT

Walter G. L. Smith, Los Angeles, Calif.

Application December 15, 1936, Serial No. 115,939

3 Claims. (Cl. 280—169)

My invention comprises a novel form of covering for contoured bodies, such as the running boards of automobiles, and includes novel means for securing the covering thereto.

In modern automobile manufacture running boards are usually covered with rubber mats and recently these rubber mats have been applied to the metal forming the running board of the automobile by molding the rubber directly to the metal during manufacture.

In present practice in the automobile industry when a running board mat becomes worn or damaged, it is necessary for the owner of the automobile to purchase a new running board from a factory for the reason that no means has yet been devised whereby a new rubber covering can be molded onto the running board of the car to replace the old covering.

The running boards of modern cars are usually contoured so that the outer edge thereof curves downwardly. It has not been found satisfactory when it is necessary to replace the rubber mat covering the running board to secure a new mat thereto by screws, beading, or the like, along the outer exposed edge of the running board, for the reason that such construction does not conform to the modern lines of automobile styling and also for the reason that a mat so secured is relatively easily torn loose by rubbing against curbs or by the force of the wind during high speed travel.

It is an object of my invention to provide a replaceable molded rubber mat adapted to be applied to the running board of an automobile which includes novel means for securing the mat to the outer exposed edge of the running board and for causing the material of the mat to conform to the contour thereof.

The novel features and objects of the invention will be made apparent from a perusal of the following part of the specification, in connection with the accompanying drawing.

In the drawing:

Fig. 1 is a utility view showing the application of my invention to the running board of an automobile.

Fig. 2 is a cross-sectional view taken as indicated by the line 2—2 of Fig. 1.

Fig. 3 is an enlarged fragmentary sectional view through a portion of the mat, showing the metal web molded therein.

Referring to Figs. 1 and 2, I show a running board 11 of an automobile of the type to which a rubber covering or mat is molded during manufacture, and to which my novel running board mat is particularly adapted to be applied for replacement of the original covering when it has become worn out or damaged.

My novel mat comprises a body 12 formed of a comparatively thin sheet of flexible material, preferably molded rubber, having molded therein a web 13 formed of a material capable of retaining any shape into which the web is deformed. Various types of sheet metal are suitable to provide the deformable web 13, but I prefer to utilize a fabricated metal material such as wire mesh, for the reason that when the wire mesh is molded into the rubber sheet the material of the sheet is bound through the interstices of the wire mesh web, obviating any likelihood of the rubber material of the body 12 becoming separated from the web member 13.

The wire mesh web 13 is preferably of such a weight and of such rigidity that it is capable of deformation into any desired shape, and is sufficiently rigid so that it will hold the material of the body 12 in the shape in which the web is formed.

The manner of installing my novel mat on the running board of an automobile or the like is as follows. An edge 14 of the mat 12 may be crimped around the outer exposed edge 15 of the running board 11 substantially in the manner shown in Fig. 2, suitable instruments being used to deform the metal web 13, and then the body of the mat is shaped to conform with the contour of the running board, for instance by bending the mat around the outer curved portion 16 thereof and stretching the mat inwardly toward the inner edge 17 of the running board, substantially as shown.

Any suitable means may be utilized to secure the inner edge of the mat 12 to the running board. For instance, a bead or metal strip 18 may be laid lengthwise over the mat 12 at the inner edge 17 of the running board 11 and secured thereto by screws or bolts 19 extending through the metal of the running board, substantially as indicated in Figs. 1 and 2.

This manner of securing a molded rubber mat to the running board of an automobile is essentially new and provides a means for replacing a worn or damaged running board cover so that the substituted cover does not differ in outward appearance from the original cover molded to the body of the running board during manufacture.

As indicated in Fig. 1, the upper surface of the mat 12 may be provided with suitable corrugations or the like, to prevent slipping and to enhance the attractiveness of the cover.

I claim as my invention:

1. A method of applying a rubber mat having a metal web molded therein to a running board of an automobile, which comprises the steps of: crimping an edge of said mat around the outer depending flange of said running board so that the rubber material and the web of said mat extends entirely around and under the edge of said depending flange; deforming said metal web of said mat to conform to the shape of said running board whereby said rubber material will be held in conformity with the contour of said running board by said metal web; and securing the inner edge of said mat to said running board.

2. In combination with a running board of a vehicle having an outer depending flange: a mat of molded rubber having a metal web molded therein capable of retaining any shape into which it is formed, and having an outer upwardly bent edge containing said web and extending contactually around and under said outer depending flange of said running board; and means for securing the inner edge of said mat to said running board after said mat has been shaped to the contour thereof, the metal web holding the material of the mat in conformity with the contour of the running board.

3. In combination with a running board of a vehicle having an outer depending flange: a mat of molded rubber having a metal web molded therein capable of retaining any shape into which it is formed, and having an outer upwardly bent edge containing said web and extending contactually around and under said outer depending flange of said running board; and means comprising a metal strip extending lengthwise of the inner edge of said mat and secured to said running board by screw means extending through said strip and the inner edge of said mat into said running board, for securing the inner edge of said mat to said running board after said mat has been shaped to the contour thereof, the metal web holding the material of the mat in conformity with the contour of the running board.

WALTER G. L. SMITH.